(12) United States Patent
Hamil et al.

(10) Patent No.: US 11,897,042 B2
(45) Date of Patent: Feb. 13, 2024

(54) VARIABLE RADIUS GASH

(71) Applicant: KYOCERA SGS PRECISION TOOLS, INC., Munroe Falls, OH (US)

(72) Inventors: Brian Hamil, Mogadore, OH (US); Doug Bonfiglio, Akron, OH (US); Steve Curtician, Ravenna, OH (US); Jacob Rak, North Canton, OH (US)

(73) Assignee: KYOCERA SGS PRECISION TOOLS, INC., Munroe Falls, OH (US)

( * ) Notice: Subject to any disclaimer, the term of this patent is extended or adjusted under 35 U.S.C. 154(b) by 0 days.

(21) Appl. No.: 17/267,112

(22) PCT Filed: Jul. 26, 2019

(86) PCT No.: PCT/US2019/043682
§ 371 (c)(1),
(2) Date: Feb. 9, 2021

(87) PCT Pub. No.: WO2020/033168
PCT Pub. Date: Feb. 13, 2020

(65) Prior Publication Data
US 2021/0162520 A1    Jun. 3, 2021

Related U.S. Application Data

(60) Provisional application No. 62/716,615, filed on Aug. 9, 2018.

(51) Int. Cl.
*B23C 5/10*    (2006.01)
(52) U.S. Cl.
CPC .......... *B23C 5/10* (2013.01); *B23C 2210/204* (2013.01); *B23C 2210/206* (2013.01); *B23C 2210/282* (2013.01)

(58) Field of Classification Search
CPC ....... B23C 5/10; B23C 5/1009; B23C 5/1018; B23C 5/1027; B23C 2210/205;
(Continued)

(56) References Cited

U.S. PATENT DOCUMENTS 5,433,655 A    7/1995   Shiokawa et al.
6,435,780 B1 *  8/2002   Flynn .................. B23C 5/10
                                                      407/53
(Continued)

FOREIGN PATENT DOCUMENTS

DE    102005043842 A1 *  3/2007   .......... B23C 5/1009
JP    2005125465 A  *  5/2005
JP    2006000985 A  *  1/2006

OTHER PUBLICATIONS

Machine translation of foreign reference JP 2006-000985, previously cited on PTO-892 dated Sep. 15, 2022. (Year: 2023).*
(Continued)

*Primary Examiner* — Nicole N Ramos
(74) *Attorney, Agent, or Firm* — Vorys, Sater, Seymour and Pease LLP; Mark A. Watkins (57) ABSTRACT

A variable radius gash geometry may be provided on a variety of rotary cutting tools. The rotary cutting tools extend along a longitudinal axis, from a shank towards a cutting face that engages a material to be cut during a plunge or ramp operation, and a plurality of gashes may be provided in the cutting face of the rotary cutting tool. The gashes may each be a full radius gash, and the radius defining each of the gashes may be unique or different from one another and tangent to an axial rake face and clearance face surrounding the gash.

8 Claims, 9 Drawing Sheets

(58) Field of Classification Search
CPC ........ B23C 2210/202; B23C 2210/209; B23C 2210/28; B23C 2210/54
See application file for complete search history.

(56) References Cited

U.S. PATENT DOCUMENTS

| | | | | |
|---|---|---|---|---|
| 9,227,253 B1* | 1/2016 | Swift | ................. | B23C 5/00 |
| 9,381,581 B1* | 7/2016 | Zaman | ................. | B23C 5/10 |
| 2004/0170480 A1* | 9/2004 | Kawai | ................. | B23C 5/10 |
| | | | | 407/53 |
| 2008/0199265 A1* | 8/2008 | Hamatake | ................. | B23C 5/10 |
| | | | | 407/54 |
| 2009/0324347 A1 | 12/2009 | Kirby et al. | | |
| 2010/0008736 A1* | 1/2010 | Matsunaga | ................. | B23C 5/10 |
| | | | | 408/230 |
| 2011/0217132 A1* | 9/2011 | Wells | ................. | B23C 5/10 |
| | | | | 407/54 |
| 2013/0017025 A1* | 1/2013 | Azegami | ................. | B23C 5/10 |
| | | | | 407/54 |
| 2013/0108382 A1* | 5/2013 | Haraguchi | ................. | B23C 5/10 |
| | | | | 407/54 |
| 2014/0133926 A1* | 5/2014 | Budda | ................. | B23C 5/10 |
| | | | | 407/54 |
| 2014/0205390 A1 | 7/2014 | Baba et al. | | |
| 2014/0294528 A1* | 10/2014 | Azegami | ................. | B23C 5/10 |
| | | | | 408/200 |
| 2015/0030396 A1* | 1/2015 | Abe | ................. | B23C 5/28 |
| | | | | 407/11 |
| 2015/0147127 A1 | 5/2015 | Shpigelman et al. | | |
| 2015/0258616 A1* | 9/2015 | Stanbach | ................. | B23C 5/10 |
| | | | | 407/54 |
| 2016/0052072 A1 | 2/2016 | Davis et al. | | |
| 2016/0074947 A1* | 3/2016 | Shpigelman | ................. | B23C 5/10 |
| | | | | 407/54 |
| 2016/0175948 A1* | 6/2016 | Sakai | ................. | B23C 5/1009 |
| | | | | 407/54 |
| 2016/0214187 A1* | 7/2016 | Fukata | ................. | B23C 5/28 |
| 2017/0028482 A1 | 2/2017 | Boulakhov et al. | | |
| 2017/0326655 A1* | 11/2017 | Kuroda | ................. | B23C 5/10 |
| 2020/0047263 A1* | 2/2020 | Maeda | ................. | B23C 5/1009 |

OTHER PUBLICATIONS

International Preliminary Report on Patentability, International Search Report and Written Opinion of the International Searching Authority for International Patent Application PCT/US2019/043682, International Filing Date of Jul. 26, 2019; dated Feb. 9, 2021; Forms PCT/IB/373 and PCT/ISA/237; 9 pages; Athina Nickitas-Etienne, Authorized Officer.

* cited by examiner

VARIABLE RADIUS GASH

CROSS-REFERENCE TO RELATED APPLICATIONS

This application claims priority to and the benefit of International Patent Application No. PCT/US2019/043682 filed Jul. 26, 2019, and U.S. Provisional Application No. 62/716,615 filed Aug. 9, 2018, which are hereby incorporated by reference herein in their entirety.

BACKGROUND

High-performance rotary cutting tools, such as end mills, may incorporate various geometrical designs, including symmetrical (or equal) geometry designs and variable (or unequal) geometry designs. Symmetrical, equal geometry designs may resonate at natural frequencies during use, and thus vibrate, known as "chatter" in machining terms and which can cause damage to the tool and unacceptable surface finish to the work piece. To control chatter in such standard, non-variable geometry cutting tools, cutting rates need to be reduced, sometimes significantly, thus hindering productivity.

Thus, modern high-performance rotary cutting tools may incorporate variable or unequal geometry designs. Exemplary variable geometry designs include, but are not limited to, unequal flute indexing, variable helix, variable rake, variable edge treatment, etc., and high-performance cutting tools may include one or more of these variable design features. By disrupting the natural frequencies that occur with equal, symmetrical geometry designs, the variable or unequal geometry designs reduce or eliminate "chatter" which can cause improve tool life and surface finish. However, variable geometry designs may subject the tool to varying chip loads, which may result in irregular wear of the cutting edges of the cutting tool.

SUMMARY

In accordance with the present disclosure, a variable radius gash geometry is provided. The variable radius gash geometry may be utilized in a variety of rotary cutting tools having cutting faces at an axial end of the rotary cutting tool. In some examples, the variable radius gash geometry may include a plurality of gash grinds each associated with an end cutting edge, wherein each of the gash grinds is defined by a unique radius such that the end cutting edges have equal length. In some of these examples, each of the gash grinds may be a full radius gash grind that is tangent to an axial rake face and a clearance face; and in some of these examples, the axial rake face and the clearance face associated with each of the plurality of gash grinds may be formed via the gash grind associated therewith. In some examples, the end cutting edges are each formed via the gash grind associated therewith. In some examples, each of the end cutting edges is associated with a flute, the flutes having an unequal flute indexing arrangement.

Also disclosed herein is a variable radius gash geometry for a rotary cutting tool. In some examples, the variable radius gash geometry may include a plurality of gash grinds each associated with an end cutting edge and each tangent to an axial rake face and a clearance face, wherein each of the gash grinds develops the end cutting edge associated therewith with a length equal to the other end cutting edges. In some of these examples, each of the gash grinds may be defined by a unique radius that is different from the other gash grinds. In some examples, the axial rake face and the clearance face associated with each of the plurality of gash grinds may be formed via the gash grind associated therewith. In some examples, the end cutting edges may each be formed via the gash grind associated therewith. In some examples, each of the end cutting edges is associated with a flute, and the flutes may have an unequal flute indexing arrangement. In some examples, each of the gash grinds defines a full radius providing a gash surface having continuous curvature equal to the full radius.

Also disclosed herein is a rotary cutting tool. In these examples, the rotary cutting tool includes a cylindrical body having a cutting portion that extends longitudinally along an axis of the cylindrical body towards an axial end of the cylindrical body; and a cutting face provided at the axial end, the cutting face having a plurality of end cutting edges that are each developed by a gash grind in the cutting face, wherein each gash grind is defined by a different radius that equalizes length of the end cutting edges.

Also disclosed herein is a method of providing a variable radius gash geometry on a cutting face of a rotary cutting tool. This method may include plunging a plurality of grinding wheels into the cutting face, wherein each grinding wheel has a different radius; and grinding a gash into the cutting face with each of the grinding wheels, wherein each of the gashes is defined by a unique radius that corresponds to the different radius of the grinding wheel associated therewith and that develops an associated end cutting edge such that each of the associated end cutting edges have equal length. In some examples, this method may include forming a full radius gash into the cutting face with each of the grinding wheels, wherein each full radius gash is tangent to an axial rake face and a clearance face associated with the full radius gash. In some examples, the method is a method of radius gash grinding that provides an axial rake face and a clearance face tangent to a radius of a gash interposing the axial rake face and clearance face.

Also disclosed herein is a method of equalizing length of end cutting edges on a cutting face of a rotary cutting tool having variable flute indexing. This method may include plunging a plurality of grinding wheels into the cutting face, wherein each grinding wheel has a different radius; and grinding gash grinds that each have a unique radius corresponding with the different radius of the grinding wheel utilized to form the gash grind, wherein the gash grinds develop the end cutting edges having equal lengths.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to rotary cutting tools having variable radius geometries and, more particularly, to rotary cutting tools with variable radius gash geometries.

The embodiments described herein provide variable radius gash geometry for rotary cutting tools, such as end mills, that reduce or eliminate uneven wear of the cutting edges.

Figure 1:
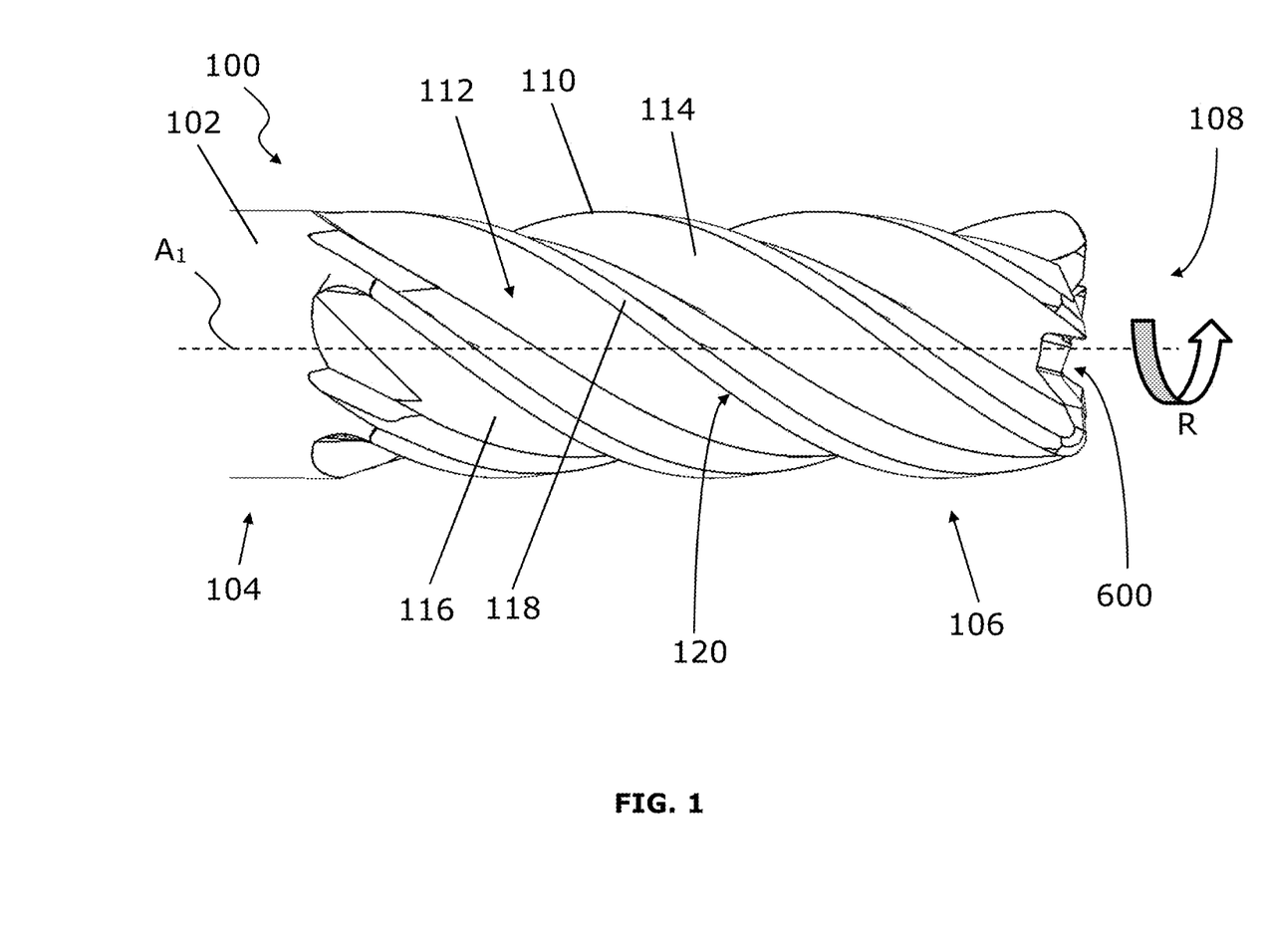
FIG. 1 is a side view of an exemplary cutting tool that may incorporate the principles of the present disclosure.

FIG. 1 is a side view of an example rotary cutting tool 100 (hereinafter, the "cutting tool 100") that may be modified to incorporate the principles of the present disclosure. The depicted cutting tool 100 is just one example cutting tool that can suitably incorporate the principles of the present disclosure. Indeed, many alternative designs and configurations of the cutting tool 100 may be employed, without departing from the scope of this disclosure. For example, the principles of the present disclosure may be incorporated with various types of rotary cutting tools, such as end mills, drills, countersinks, counter bores, taps and dies, reamers, routers, etc. Thus, while the cutting tool 100 is illustrated and described as an end mill, it will nevertheless be appreciated that chip breaking features disclosed herein may be incorporated onto other types of rotary cutting tools without departing from the present disclosure. In the illustrated example, the cutting tool 100 is configured as an end mill having five (5) flutes and may be used to mill a variety of materials including ferrous type work piece materials such as steel, stainless steel, titanium, etc. However, the cutting tool 100 may be differently configured with more or less flutes, for example, a multi-flute router, used for routing CFRP and plastic type materials. In some examples, the cutting tool 100 may include seven (7) flutes or any other flute counts. Regardless, embodiments described herein may be utilized with any number of cutting tools, regardless of their flute count. Thus, embodiments described herein are not limited by the flute count of the cutting tool on which it is disposed.

As illustrated, the cutting tool 100 generally includes a cylindrical body 102 that extends longitudinally along an axis $A_1$ of the cylindrical body 102. Here, the cylindrical body 102 includes a shank portion 104 and a cutting portion 106 that generally defines the length of cut of the cutting tool 100, and the cutting portion 106 extends longitudinally along the axis $A_1$ to an axial face or axial end 108 of the cutting tool 100. The cutting portion 106 is illustrated as having a generally cylindrical shaped periphery, but it may be configured with various other geometries without departing from the present disclosure, including but not limited to a frusto-conical shape or ball nose shape.

The cutting portion 106 includes a plurality of blades 110 that are separated by a plurality of flutes 112. Each of the blades 110 has a leading face surface 114, a trailing face surface 116, and at least one radial relief surface 118 that bridge the leading face surface 114 and trailing face surface 116. As to each of the blades 110, a cutting edge (or lateral or side cutting edge) 120 is formed at the intersection between the leading face surface 114 and the radial relief surface 118. Here, the blades 110 and flutes 112 extend along the cutting portion 106, helically about the axis $A_1$. The blades 110 may be oriented at various helix angles that are measured with respect to the axis $A_1$, and in other non-illustrated embodiments, the blades 110 and the flutes 112 may even be oriented parallel to the axis $A_1$. During operation, the cutting tool 100 rotates in a direction R about the axis $A_1$, and chips are removed from the work piece upward through the flutes 112 and towards the shank portion 104.

The radial relief surface 118 may have various configurations. For example, the radial relief surface 118 may exhibit a generally cylindrical configuration, a generally planar configuration, a not-concave configuration, a faceted configuration, or an eccentric configuration when evaluated in cross section. Also, the radial relief surface 118 may include one or more relief surfaces that are oriented at one or more corresponding relief angles. For example, the radial relief surface 118 may include a primary relief surface disposed contiguous with the cutting edge 120 extending at a first relief angle relative to a tangential line drawn at the cutting edge 120. In other examples, the radial relief surface 118 may include a secondary relief surface that is disposed on a side of the primary relief surface opposite of the cutting edge 120 at a second relief angle relative to the previously mentioned tangential line, where the magnitude of the second relief angle is greater than the magnitude of the first relief angle. In even other examples, the radial relief surface 118 may include additional relief surfaces, such as a tertiary portion disposed on a side of the second relief surface that is opposite of the first relief surface. These relief surfaces may be provided linearly, or may extend arcuately to blend into each other and/or the trailing face surface 116.

Figure 2:
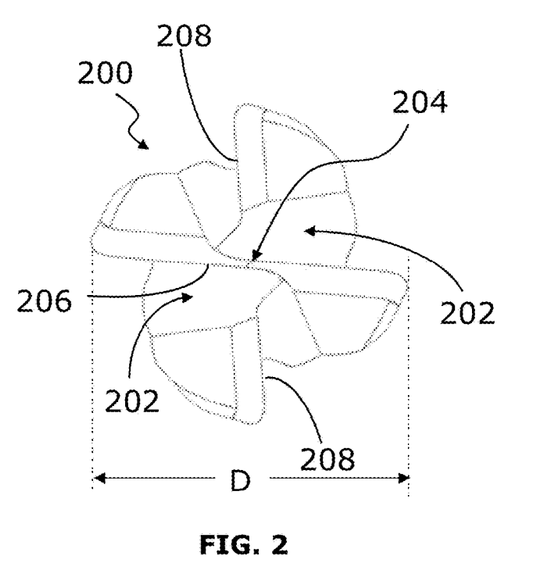
FIG. 2 illustrates a cutting face of a tool having an exemplary center cutting design.

In some examples, the cutting tool 100 has at least one end cutting edge extending beyond half a diameter of the cutting tool 100, thereby allowing cutting across the entire diameter of the cutting tool. This is referred to as center-cutting end design, and FIG. 2 illustrates an exemplary center cutting end design 200, according to one or more embodiments. Here, the center cutting end design 200 includes two (2) flutes 202 that extend to (or beyond) a center 204 of a cutting diameter D of the tool, to thereby define center cutting edges 206 extending across the center 204. Here, a pair of end cutting edges 208 that do not extend to (or stop short of) the center 204 of the cutting diameter D and are thus shorter than the center cutting edges 206. The center cutting end design 200 enables the cutting tool 100 to do a direct plunge (axially) into a material to cut similar to a drilling operation.

Figure 3:
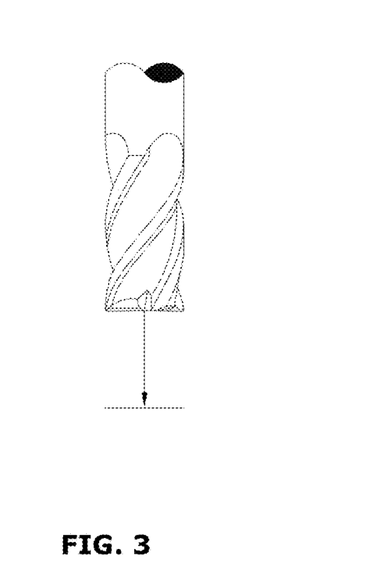
FIG. 3 illustrates an example plunge operation of the tool having the center-cutting design of FIG. 2.

FIG. 3 illustrates a plunge operation of a cutting tool having the center cutting end design 200 of FIG. 2. This results in a hole in the material from which the cutting tool 100 may then mill radially. Drill design, however, is more effective than end mill design for entering material axially to make a hole. And, although plunge milling with the cutting tool 100 having a center-cutting end design (e.g., such as the center cutting end design 200 of FIGS. 2-3) is an effective operation, it is limited in use due to its aggressiveness, especially in difficult to machine materials.

Figures 4, 5:
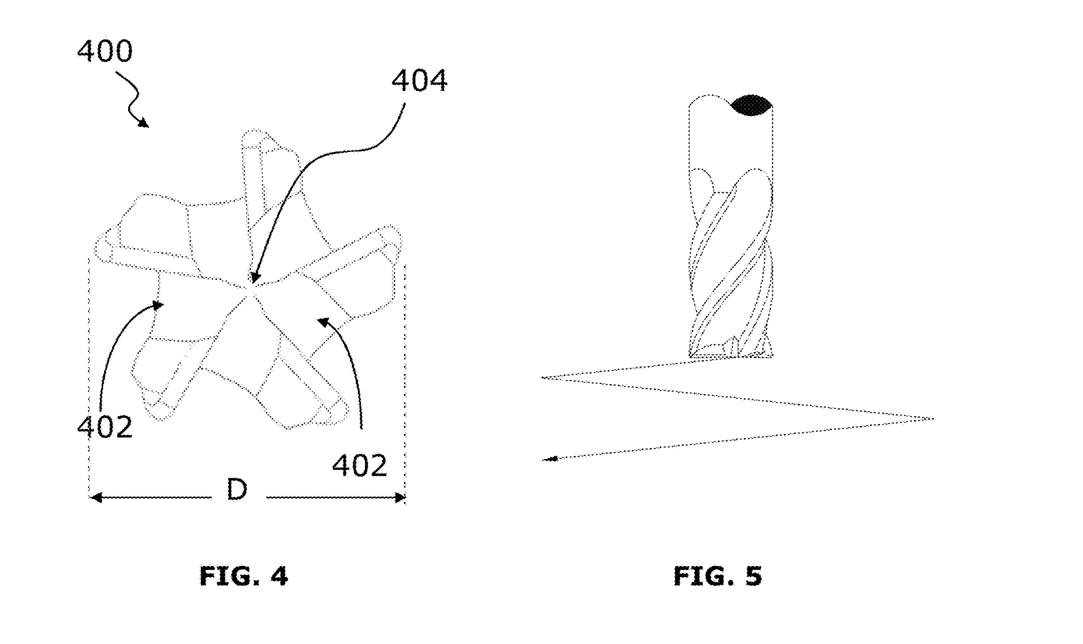
FIG. 4 illustrates a cutting face of a tool having an exemplary non-center-cutting design.
FIG. 5 illustrates an example ramping operation of the tool having the non-center-cutting design of FIG. 4.

In other examples, however, the cutting tool 100 may have a non-center-cutting end design. FIG. 4 illustrates an exemplary non-center-cutting end design 400, according to one or more examples. Here, the non-center cutting end design 400 includes five (5) flutes 402 that do not extend to a center 404 of the tool's cutting diameter D. While the non-center-cutting end design 400 may inhibit direct axial plunging due to its open design where the flutes 402 do not extend to or past the center 404, the non-center-cutting end design 400 is effective at aggressively ramping into the material. In particular, the open design of the non-center-cutting end design 400 provides extra room for material or chip evacuation, thereby making the non-center-cutting end design 400 effective and/or efficient at ramping into a material. FIG. 5 illustrates a ramping operation of a cutting tool having the non-center-cutting design of FIG. 4. The non-center-cutting end design 400 provides flexibility as the cutting tool 100 having such design may be manufactured from a carbide blank with a central hole that permits the cutting tool 100 to be utilized with a through the spindle coolant delivery system.

The cutting tool 100 also includes a gash (or gash relief or gash grind) 600 formed into the axial end 108 of the cutting tool 100. The configuration of the gash 600 may determine whether the cutting tool 100 incorporates a center cutting end design or a non-center cutting end design, and may thus determine the axial feed capabilities of the cutting tool 100 (i.e., whether it may plunge into the material, and parameters at which it may plunge there-into, or whether it may ramp into the material, and the parameters at which it may ramp there-into). The gash 600 is more clearly illustrated in FIGS. 6-7, which are isometric and detailed side views of the cutting tool 100 of FIG. 1, respectively. The cutting tool 100 includes a cutting face 602 at the axial end 108 of the cutting tool 100 that engages and cuts the material when plunging or ramping into the material. The gash 600 is a notch or clearance that is ground or otherwise arranged on the cutting face 602, between an axial rake face 604 and a clearance face 606, so as to provide room for chip evacuation as the cutting tool 100 is plunging or ramping into the material. As more fully described herein, the axial rake face 604 and the clearance face 606 may be formed when grinding the gash 600, for example, the axial rake face 604 and the clearance face 606 may be formed during radius gash grinding. The gash 600 is a grind that helps form or develop an end cutting edge 608 of the cutting tool 100 that engages material when feeding the cutting tool 100 into material in an axial direction along the axis $A_1$. Thus, the end design of the cutting tool 100 may depend on the configuration of the gash 600.

Various parameters define the gash 600. For example, the gash 600 may be arranged at a gash angle 702 (see FIG. 7), which is the relief angle of the gash 600. The gash angle 702 is measured from a gash surface 610 (i.e., a bottom surface 610 of the gash 600) to a cutting diameter D (i.e., margin to margin) of the cutting face 602. As exemplified in FIG. 7, to measure the gash angle 702, the axial or end cutting edge 608 is rotated to a centerline of the cutting tool 100 (i.e., the axis $A_1$), and the gash angle 702 is measured parallel to the centerline (i.e., axis $A_1$) of the cutting tool 100. In addition, the gash 600 may have a depth parameter and a radius parameter. The gash angle, depth, and radius of the gash 600 may be designed and closely controlled to balance strength with efficient cutting of the cutting tool 100. In some examples where the cutting tool 100 includes a plurality of gashes 600, each of the gashes 600 may include the same gash angle, the same gash depth parameter, and the same gash radius parameter; however, in some examples, one or more of the gashes 600 may have one or more parameters different from one or more of the other gashes 600.

Figure 6:
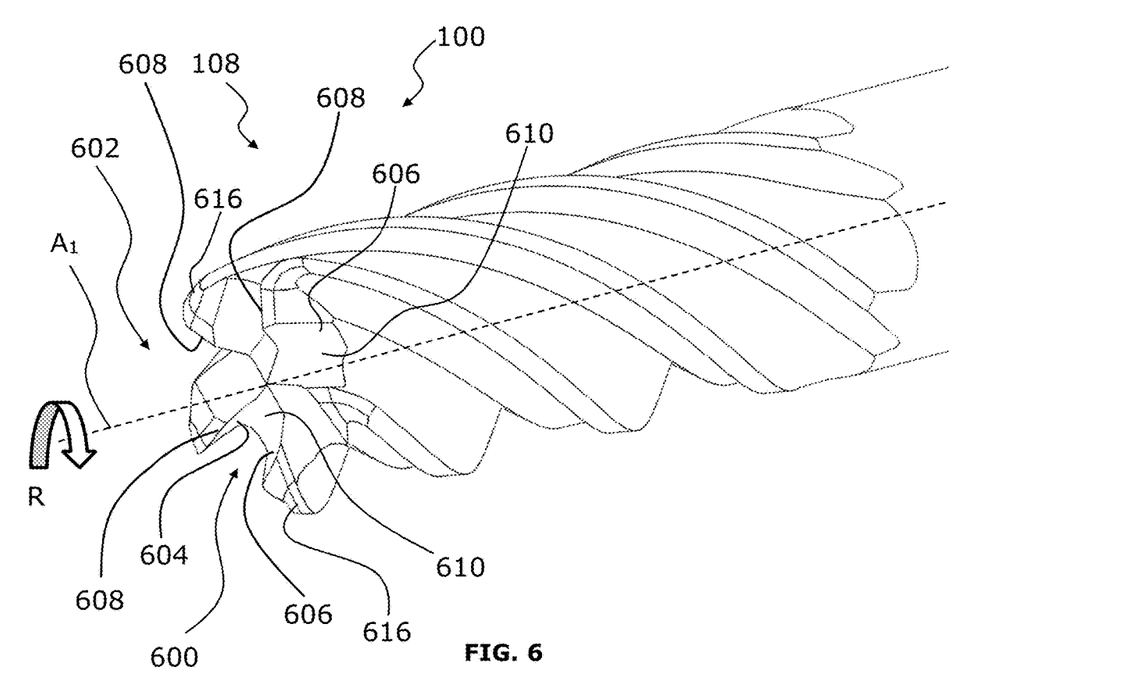
FIG. 6 is an isometric view of the cutting tool of FIG. 1.
Figure 7:
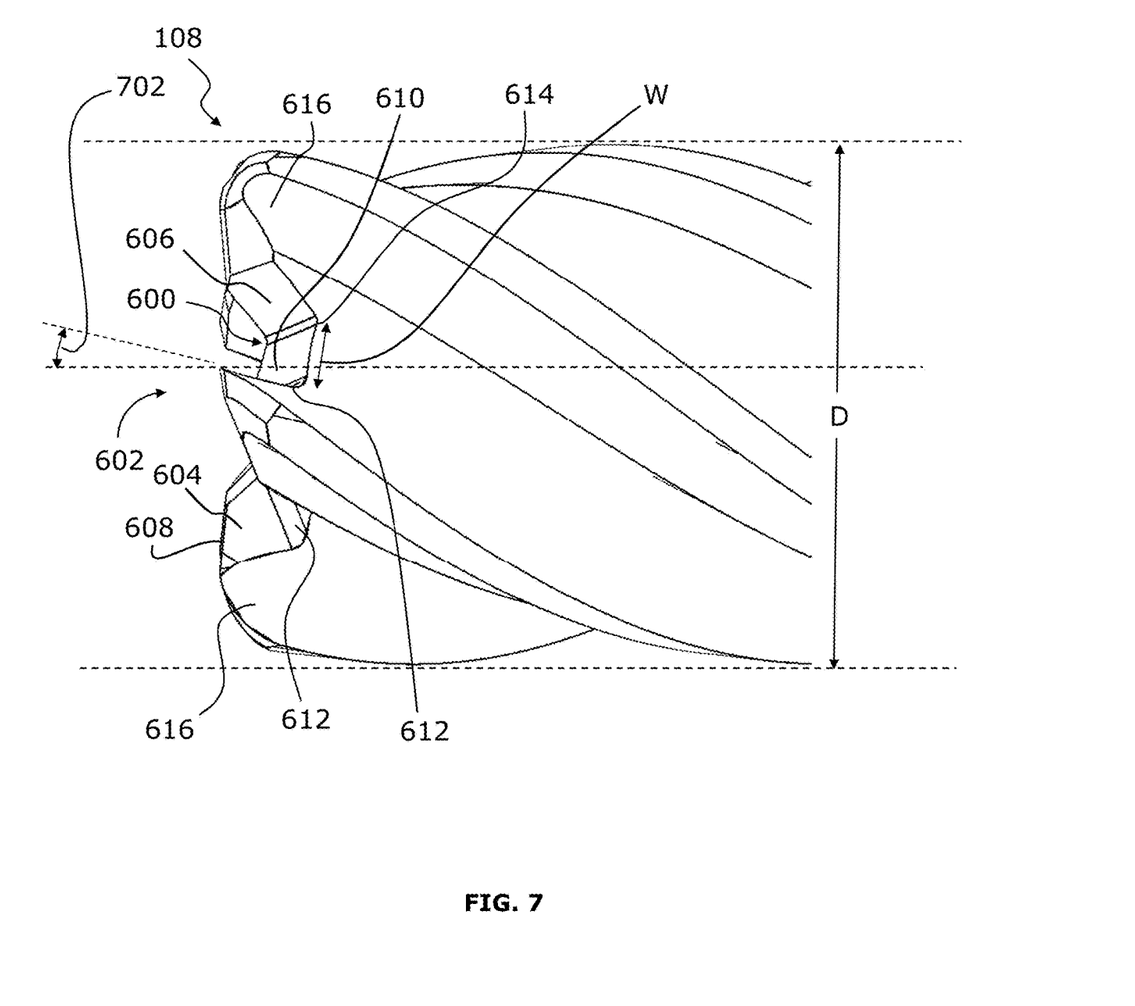
FIG. 7 is a detailed side view of the axial end of the cutting tool of FIG. 1.

When forming the gash 600 in the cutting tool 100, the grinding wheel that produces the gash 600 enters the cutting face 602 of the cutting tool 100, and "walks" laterally to provide the gash 600 with a width dimension W. Laterally "walking" the grinding tool to form the gash 600 in this manner imparts a square (or trapezoidal) shaped geometry on the gash 600 (i.e., a squarish gashing or trapezoidal gashing), as illustrated in FIG. 6 and FIG. 7. Here, the squarish (or trapezoidal) gashing includes a generally flat gash surface 610 and the axial rake face 604 and the clearance face 606 extend therefrom at respective junctions 612,614 with the gash surface 610 (see FIG. 7). Also, radiused corners are ground at the junction 612 between the gash surface 610 and the axial rake face 604 and at the junction 614 between the gash surface 610 and the clearance face 606, and the radius of such radiused corners is equal to the radius of the grinding wheel (or other tool) utilized to grind the gashes 600. In some examples, a single conventional grinding wheel is utilized to grind the gashes 600 (i.e., to form the gash 600 grinds). However, such squarish (trapezoidal) gashing creates a weak point (or weakness) that is susceptible to breakage or failure, for example, breakage or chipping a corner 616 at the axial end 108 of the cutting tool 100. Also, gashes 600 formed in this manner often have equal widths W (i.e., the width W of the gash surface 610 is the same for each of the gashes 600 and flute 112 associated therewith) but, in examples where the cutting tool 100 has unequal indexing (or variable indexing), the gashes 600 formed (or ground) in that manner may result in the end cutting edges 608 having unequal (or different) lengths.

Figure 8:
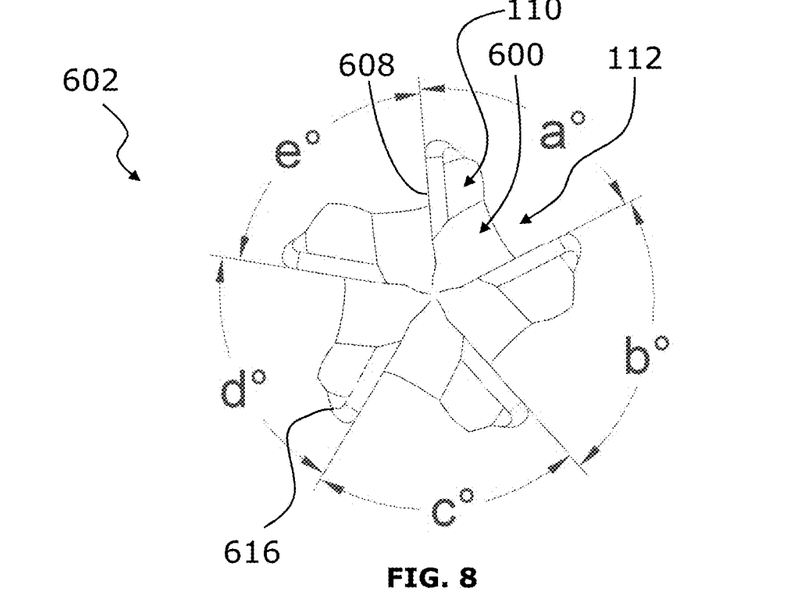
FIG. 8 illustrates the cutting face of a cutting tool having unequal flute indexing.
Figure 9:
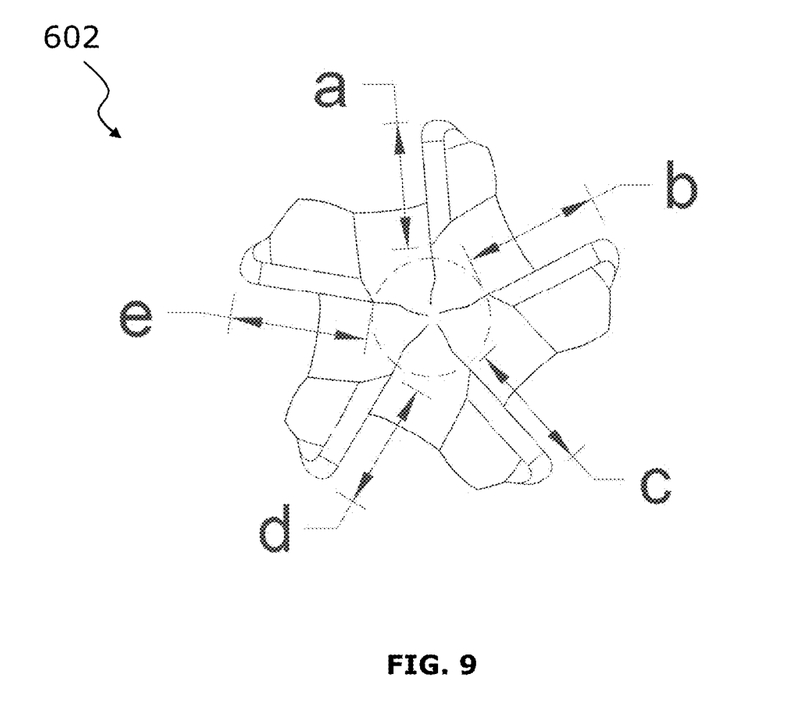
FIG. 9 illustrates the cutting face of FIG. 8 having end cutting edges of varying lengths due to the unequal flute indexing.

FIGS. 8-9 are exemplary end views of cutting tools having unequal (or variable) indexing of the blades 110 and the flutes 112, wherein the end cutting edges 608 produced by the gash 600 grinds have unequal lengths. In particular, FIG. 8 illustrates an example of the cutting face 602 having unequal flute indexing and FIG. 9 illustrates how grinding (or forming) the gashes 600 on the cutting face 602 of FIG. 8 that incorporates unequal flute indexing provides the end cutting edges 608 with unequal lengths. Here, the cutting tool 100 incorporates unequal flute indexing such that the flutes 112 are arranged at different index angles a°, b°, c°, d°, e° (FIG. 8), and grinding the gashes 600 into the cutting face 602 such that the gashes 600 each have equal widths W results in the end cutting edges 608 having unequal lengths a, b, c, d, e (FIG. 9). Thus, providing the gashes 600 with uniform dimensions (i.e., uniform dimensioned gashes 600) in a cutting tool 100 having unequal flute indexing may result in the end cutting edges 608 having varying (or different) lengths. However, this may result in irregular wear to the end cutting edges 608, for example, during aggressive ramping operations, in addition to weakening of the corners 616 as mentioned above.

In other embodiments, the cutting tool 100 may include a variable radius gash geometry. FIGS. 10-16 illustrate an exemplary variable radius gash geometry, according to one or more embodiments of the present disclosure. Variable radius gash geometry includes, or is defined by, a plurality of full radius gashes, each of unique size and each tangent to its neighboring axial rake face and clearance face. Thus, variable radius gash geometry is a grind feature that may include grinding each gash to have a unique or different radius to provide a plurality of variable radius gashes, and each such variable radius gash may be ground with a full radius (i.e., a continuous radius from the axial rake face to the clearance face) such that it is tangent to its associated axial rake face and the clearance face. This may be accomplished with a single angle form wheel utilized to cut gashes of different radii. Here, the single angle form wheel, that may vary in size according to the size of the cutting tool 100 being made or modified, generates the cutting face (axial rake face), the radius in the bottom of the gash, and the clearance face via multi-axis movements of the single angle form wheel controlled, for example, by a computer numerical control ("CNC") grinding program. Thus, the axial rake face, the radius of the gash, and clearance face may all be formed during the radius gash grinding. However, in other examples, differently sized grinding wheels (i.e., multiple formed wheels) may be utilized to form the gashes of different radii, and in such latter examples, the differently sized grinding wheels may each cut an individual variable radius gash via an individual plunge grind operation. Accordingly, a gash surface of each such variable radius gash includes a continuous curvature extending between its neighboring axial rake face and clearance face. In addition, variable radius gash geometry described herein may be incorporated into cutting tools having center cutting end designs or a non-center cutting end design.

The dimensions of the different gash radii utilized in the variable radius gash geometry may depend on dimensions of the cutting tool, the flute indexing, and/or the desired length of the resulting end cutting edges. For example, the size of the variable radius gash may be dependent on the flute count and diameter of the particular cutting tool into which the variable radius gash geometry is to be incorporated. In some examples, the variable radius gashes each have the same depth into the cutting face as measured along the longitudinal axis, but in other examples, one or more of them may have a different depth. Also, each of the full radius gashes may have the same gash angle, or one or more of the full radius gashes may have a gash angle that is different from the gash angles of one or more of the other full radius gashes. The gash angle of one or more of the full radius gash grinds may be selected from a range of gash angles, positive or negative, and in some examples the gash angle of one or more of the full radius gash grinds is selected based on the material to be machined. In addition, the gash angle of the various radius gash grind may vary from flute to flute such that, for example, the various radius gash grind in a first flute may oriented a positive gash angle and the gash angle of the various radius gash grind in a second flute may be oriented at a different positive gash angle or at a negative gash angle, etc. In some examples, variable radius gash geometry utilizes full radius gashes oriented at the same or different gash angles. This will allow the cutting tools incorporating variable radius gash geometry to include variable axial rake, similar to how the variable radial rake is provided in the Z-CARB-AP series tools provided by KYOCERA SGS Precision Tools. The diameters of the variable radius gashes depend on the diameter and flute count of each tool and may thus include any number of dimensions depending on those parameters.

By grinding a plurality of full radius gashes, each of unique size and tangent to the neighboring axial rake and clearance faces, the lengths of the end cutting edge will be the same. Thus, variable radius gash geometry may be incorporated into cutting tools having unequal flute indexing to equalize the lengths of the end cutting edges formed by the gash grind, and thereby improve ramping ability and overall performance. In addition, because the gashes of the variable radius gash geometry have a full radius (rather than "walking" the grinding wheel to form squarish or trapezoidal gashing), the corners of the cutting tool are significantly strengthened. Indeed, load testing has shown that the variable radius gash geometry may increase the strength of the corners up to three (3) times compared to conventional gash geometry. The increased strength provided by the variable radius gash geometry also stabilizes the cutting tool during heavy milling, which promotes tool life.

The variable radius gash geometry may be provided on various types of rotary cutting tools, such as the cutting tool 100 described with reference to FIGS. 1-9. Thus, the variable radius gash geometry described herein may be incorporated into end mills, drills, countersinks, counter bores, taps and dies, reamers, routers, etc. However, while the variable radius gash geometry is described and illustrated with reference to an end mill, it will nevertheless be appreciated that the variable radius gash geometry disclosed herein may be incorporated onto other types of rotary cutting tools without departing from the present disclosure. In addition, the variable radius gash geometry may be incorporated into cutting tools with unequal flute indexing as mentioned above, but may also be incorporated into cutting tools having other types of flute indexing.

Figure 10:
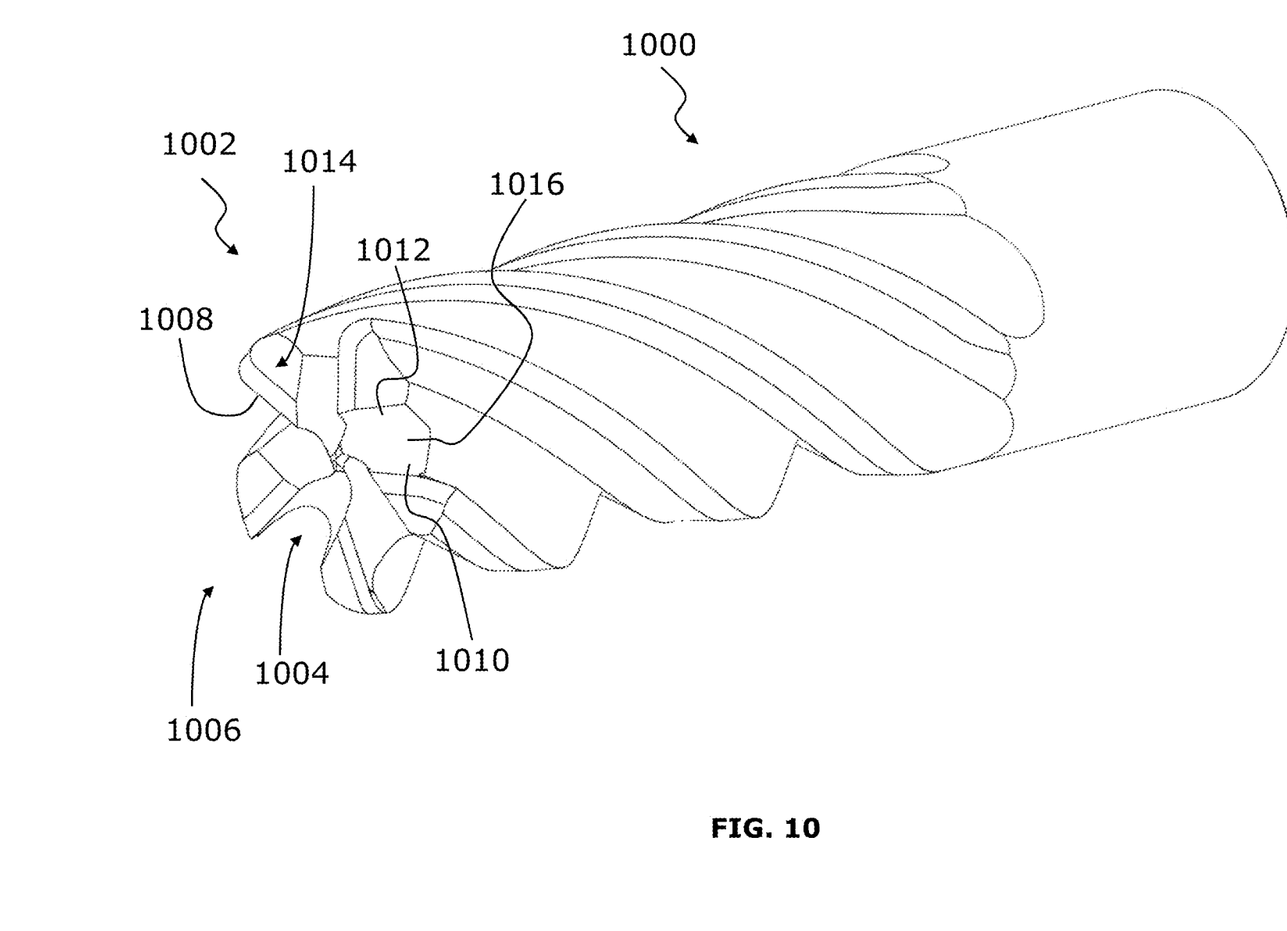
FIG. 10 is an isometric view of a cutting tool incorporating variable radius gash geometry, according to one or more embodiments of the present disclosure.

FIG. 10 is an isometric view of a cutting tool 1000 incorporating a variable radius gash geometry 1002, according to one or more embodiments of the present disclosure. As illustrated, the variable radius gash geometry 1002 includes a plurality of gashes 1004 arranged at an axial end 1006 of the cutting tool 1000. A plurality of end cutting edges 1008 are formed at the axial end 1006, with each of the end cutting edges 1008 corresponding with one of the gashes 1004. Also, each gash 1004 includes a gash surface 1016, with an axial rake face 1010 extending from the end cutting edge 1008 into a first side of the gash surface 1016 and a clearance face 1012 extending from an opposite second side of the gash surface 1016, away from the axial rake face 1010 and towards a neighboring end cutting edge 1008. Here, the gash surface 1016 includes a continuous curvature of constant radius, with the gash surfaces 1016 of the different gashes 1004 having unique or different radii. However, one or more of the gash surfaces 1016 may have a flat portion. Thus, grinding each of the gashes 1004 into a cutting face at the axial end 1006 of the cutting tool 1000 develops a corresponding one of the plurality of end cutting edges 1008, as well as the gash surfaces 1016 and the corresponding axial rake face 1010 and the corresponding clearance face 1012 of the gash 1004.

Figure 11:
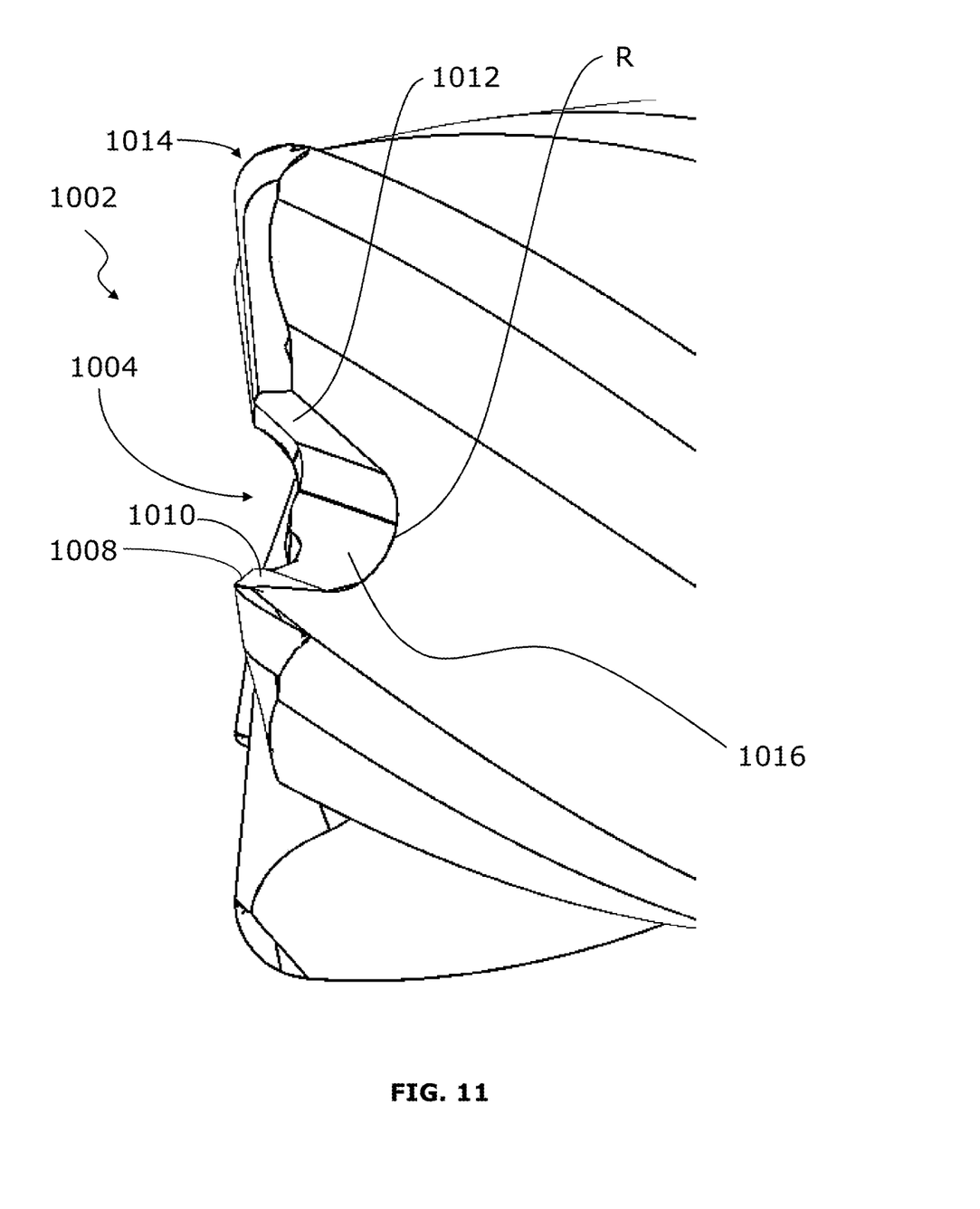
FIG. 11 is a detailed side view of the axial end of the cutting tool of FIG. 10.

FIG. 11 is detailed side view of the variable radius gash geometry 1002 of FIG. 10. As illustrated, the gashes 1004 each include (or, are each defined by) a radius R. In particular, each of the gashes 1004 is a full radius gash, defined by its radius R, such that the gash 1004 is tangent to the axial rake face 1010 and the clearance face 1012 associated therewith. Grinding the gash 1004 as a full radius gash adds strength to a corner 1014 of the cutting tool 1000.

Also, the radius R for each of the gashes 1004 is unique or different from the radii of the other gashes 1004, thereby providing the cutting tool 100 with the variable radius gash geometry 1002 and equalizing the lengths of the end cutting edges 1008 formed when grinding the gashes 1004. In the illustrated examples, the gash surface 1016 is ground with radius R that is tangent to the axial rake face 1010 and the clearance face 1012 surrounding the gash surface 1016.

Figure 12:
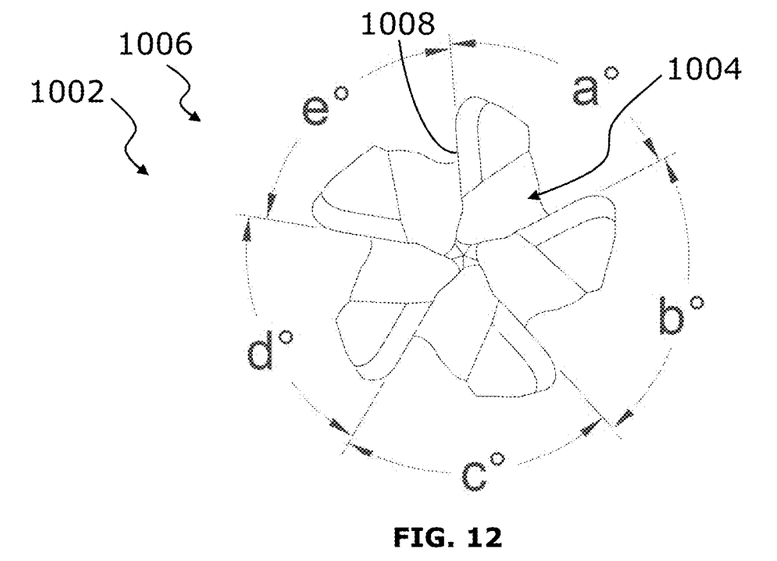
FIG. 12 illustrates the cutting face of a cutting tool with unequal flute indexing and incorporating variable radius gash geometry, according to one or more embodiments of the present disclosure.
Figure 13:
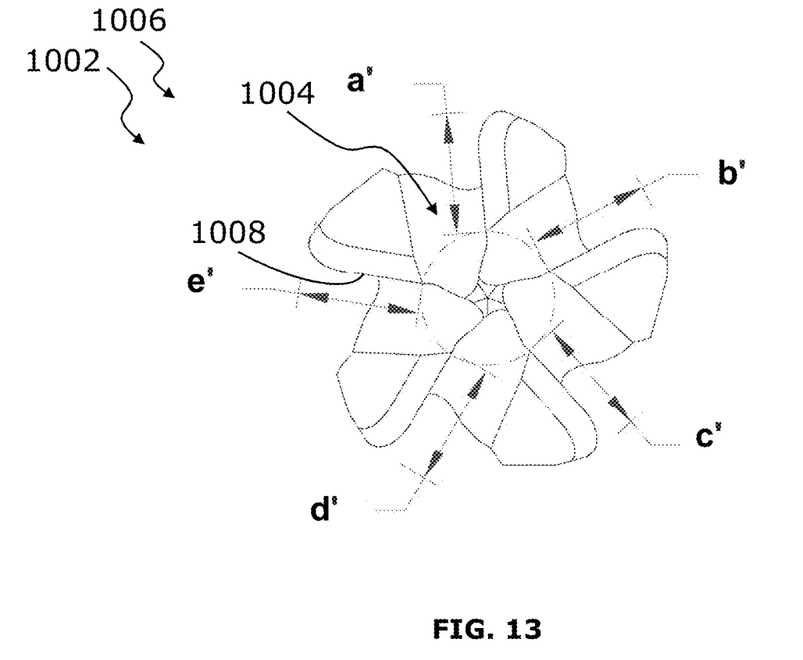
FIG. 13 illustrates the cutting face of FIG. 12 with end cutting edges of equal lengths due to the variable radius gash geometry.

FIGS. 12-13 illustrate how providing the gashes 1004, each with a unique size or radius and tangent to its corresponding axial rake and clearance faces, equalizes the lengths of the end cutting edges 1008. FIGS. 12 and 13 are end views of the cutting tool 1000 of FIGS. 10 and 11 configured with unequal indexing, and illustrate how the variable radius gash geometry 1002 equalizes the lengths of the end cutting edges 1008 formed by the gash 1004 grinds. In particular, FIG. 12 illustrates an example of the cutting tool 1000 having unequal flute indexing and FIG. 13 illustrates how grinding (or forming) grinding the variable radius gash geometry 1002 forms the end cutting edges 1008 with equal lengths a', b', c', d', e'. Here, the cutting tool 1000 incorporates unequal flute indexing such that the flutes are arranged at different index angles a°, b°, c°, d°, e° (FIG. 12), and grinding the gashes 1004, each with a unique and full radius R that is tangent to the axial rake face 1010 and the clearance face 1012, results in the end cutting edges 1008 having equal lengths a', b', c', d', e' (i.e., a'=b'=c'=d'=e').

Figure 14:
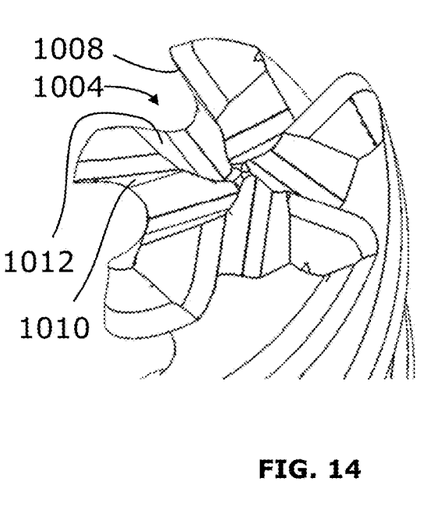
FIG. 14 is a detailed perspective view of a cutting face of a cutting tool having a plurality of variable radius gash grinds, according to one or more embodiments of the present disclosure.
Figure 15:
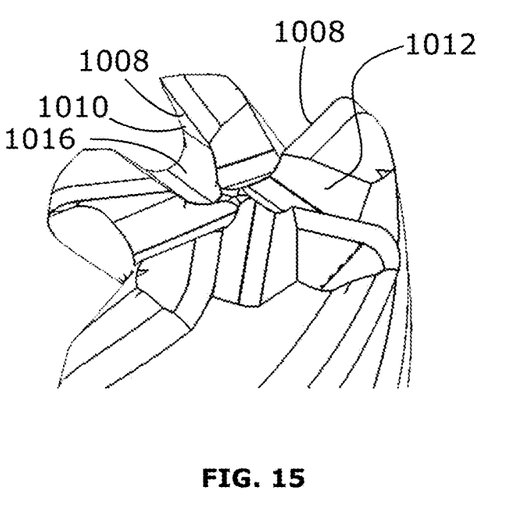
FIG. 15 is an alternate perspective view of FIG. 14.
Figure 16:
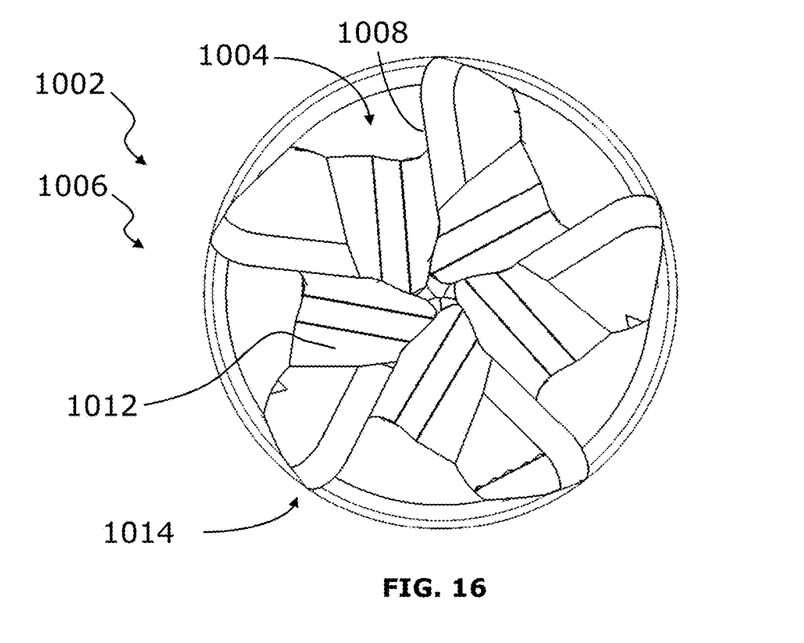
FIG. 16 is a top view of a cutting face of a cutting tool having a plurality of variable radius gash grinds, according to one or more embodiments of the present disclosure.

FIGS. 14-15 are various perspective views of the cutting tool 1000 having the variable radius gash geometry 1002 of FIGS. 10-11, whereas FIG. 16 is a top view thereof. As illustrated, the gashes 1004 are each a full radius R, tangent to the axial rake face 1010 and the clearance face 1012, and the full radius R of each of the gashes 1004 is unique (or different) from the other gashes 1004. This results in the end cutting edges 1008 having equal lengths, which adds strength and durability to the corners 1014.

Also disclosed herein are various methods associated with the variable radius gash geometry. For example, this disclosure includes methods for forming a variable radius gash geometry, methods for manufacturing a rotary cutting tool having a variable radius gash geometry on a cutting face of the rotary cutting tool, methods for equalizing end cutting edges of a rotary cutting tool having variable flute indexing, etc. Such methods generally include generating a variable radius form for each of the variable radius gashes via use of a single form grinding wheel. Here, for example, the single form grinding wheel may be plunged into a cutting face (to form one variable radius gash at a time) and then walked along a radius tool path (corresponding with the unique radius of the particular gash being ground) to grind the radius form of each variable radius gash. For example, a CNC grinding program may control the single form grinding wheel to cut with multi-axis movements the cutting face (axial rake face), the radius in the bottom of the gash, and the clearance face. Thus, the axial rake face, the radius of the gash, and clearance face may all be formed during the radius gash grinding However, such methods may instead generally include plunging a plurality of grinding wheels into a cutting face of a rotary cutting tool, one at a time or two or in groups of two or more at the same time, where each grinding wheel has a unique or different radius to form gash grinds having corresponding unique or different radii and to develop end cutting edges having the same length (i.e., to equalize length of the end cutting edges).

In one example, a method includes a step of providing a rotary cutting tool having a cylindrical body that extends along a longitudinal axis towards an axial end, wherein the rotary cutting tool further includes a cutting face at the axial end. This method may also include a step of providing a single form grinding wheel (or other cutting tool). This method may also include a step of plunging the grinding wheel into the cutting face, axially along the longitudinal axis, and then walking the grinding wheel along a first radius path, so as to form a first gash grind having a first unique (or different) radius that is tangent to the axial rake face and the clearance face associated therewith. This method then includes a step of plunging the grinding wheel into the cutting face, axially along the longitudinal axis, and then walking the grinding wheel along a second radius path, so as to form a second gash grind having a second unique (or different) radius that is tangent to the axial rake face and the clearance face associated therewith. It will be appreciated that this step of forming the unique gash grinds may be repeated "n" number of times, where the number "n" corresponds with the number of flutes present on the cutting tool. Thus, for a tool having seven (7) flutes, this method may then include a step of plunging the grinding wheel into the cutting face as described above, so as to form a third gash grind having a third unique radius, a fourth gash grind having a fourth unique radius, a fifth gash grind having a fifth unique radius, a sixth gash grind having a sixth unique radius, and a seventh gash grind having a seventh unique radius. Accordingly, this method may be utilized with rotary cutting tools having any number of flutes. By plunging the grinding wheel into the cutting face when forming each uniquely dimensioned gash grind, the grinding wheel enters the cutting face so as to form or develop a gash grind having a radius that is tangent to the axial rake face and the clearance face, and wherein the grinding wheel follows a unique radius tool path when forming each gash such that the radii of the gash grinds are different from each other (i.e., unique). This method may also include a step of removing or withdrawing each of the plurality of grinding wheels from the cutting face, one at a time or simultaneously.

In this method, the step of plunging the grinding wheel into the cutting face may include forming either the axial face or the clearance face of the gash, and then continuing along the radius tool path to form the gash surface tangent to the previously formed axial face or the clearance face, and then forming the other of the clearance face or axial face of the gash tangent to the unique radius of the radius tool path. Thus, when forming the axial face and the clearance face, the grinding tool may follow a linear tool path either when plunging into the cutting face or when being retracted therefrom. Thus, the method may include forming the gash surface of the gash, together with forming the axial rake race and clearance thereof that are tangent to a radius defining the gash surface.

In another example, a method includes a step of providing a rotary cutting tool having a cylindrical body that extends along a longitudinal axis towards an axial end, wherein the rotary cutting tool further includes a cutting face at the axial end. This method may also include a step of providing a plurality of grinding wheels (or other cutting tools) that each have a unique or different radius. This method may also include a step of plunging each of the plurality of grinding wheels into the cutting face, axially along the longitudinal axis, so as to form a plurality of gash grinds that each have a unique (or different) radius that is tangent to the axial rake face and the clearance face. By plunging the grinding wheels into the cutting face, each grinding wheel enters the cutting face so as to form or develop a gash grind having a radius that is tangent to the axial rake face and the clearance face, wherein the radii of the gash grinds are different from each other (i.e., unique). The grinding wheels may be plunged into the cutting face one at a time, or two or more of the grinding wheels may be plunged into the cutting face simultaneously. This method may also include a step of removing or withdrawing each of the plurality of grinding wheels from the cutting face, one at a time or simultaneously.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A rotary cutting tool that includes a variable radius gash geometry and a plurality of end cutting edges, the variable radius gash geometry comprising:
    a plurality of gash grinds, with each of the plurality of gash grind being associated with one of the plurality of end cutting edges;
    a first gash grind of the plurality of gash grinds positioned between a first end cutting edge from the plurality of end cutting edges and a second end cutting edge from the plurality of end cutting edges, the first gash grind having a first gash surface with a first width extending between a first axial rake face and a first clearance face, the first axial rake face extending from the first end cutting edge towards the first gash surface, and the first clearance face extending from the first gash surface away from the first axial rake face and towards the second end cutting edge; and
    a second gash grind having a second gash surface with a second width extending between a second axial rake face and a second clearance face, the second axial rake face extending from the second end cutting edge towards the second gash surface, and the second clearance face extending from the second gash surface away from the second axial rake face and towards a third end cutting edge;
    wherein the first gash surface is defined by a first radius and the second gash surface is defined by a second radius that is different than the first radius,
    wherein each of the plurality of end cutting edges are of equal length.

2. The rotary cutting tool of claim 1, wherein the first end cutting edge and the second end cutting edge are arranged in a non-center cutting design such that first end cutting edge and the second end cutting edge do not extend to a center of a cutting diameter of a cutting surface of the rotary cutting tool.

3. The rotary cutting tool of claim 2, wherein the first axial rake face and the first clearance face are formed during an individual gash grinding operation that forms the first gash surface.

4. The rotary cutting tool of claim 3, wherein the first end cutting edge from the plurality of end cutting edges is developed during the individual gash grinding operation.

5. The rotary cutting tool of claim 1, wherein each end cutting edge from the plurality of end cutting edges is associated with a flute from a plurality of flutes, and wherein the plurality of flutes have an unequal flute indexing arrangement.

6. The rotary cutting tool of claim 1, wherein either or both of the first gash surface and the second gash surface comprises a flat portion.

7. The rotary cutting tool of claim 1, wherein:
    the first gash surface comprises a first continuous curvature extending between the first axial rake face and the first clearance face, and
    the second gash surface comprises a continuous curvature extending between the second axial rake face and the second clearance face.

8. The rotary cutting tool of claim 1, wherein:
    the first gash surface comprises a first continuous curvature extending between the first axial rake face and the first clearance face, or
    the second gash surface comprises a continuous curvature extending between the second axial rake face and the second clearance face.

* * * * *